United States Patent
Ponnuswamy

(10) Patent No.: US 8,625,417 B2
(45) Date of Patent: Jan. 7, 2014

(54) WIRELESS ROAMING WITH QOS AND DYNAMIC CALL CAPACITY MANAGEMENT

(75) Inventor: Subbu Ponnuswamy, Scotts Valley, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 1172 days.

(21) Appl. No.: 11/528,962

(22) Filed: Sep. 27, 2006

(65) Prior Publication Data
US 2008/0068991 A1    Mar. 20, 2008

Related U.S. Application Data

(60) Provisional application No. 60/845,720, filed on Sep. 18, 2006.

(51) Int. Cl.
*G01R 31/08* (2006.01)
*H04W 4/00* (2009.01)

(52) U.S. Cl.
USPC ............ 370/230; 370/328; 370/329; 370/338

(58) Field of Classification Search
None
See application file for complete search history.

(56) References Cited

U.S. PATENT DOCUMENTS

| | | | |
|---|---|---|---|
| 6,018,659 A * | 1/2000 | Ayyagari et al. | 455/431 |
| 6,697,346 B1 * | 2/2004 | Halton et al. | 370/335 |
| 7,054,296 B1 * | 5/2006 | Sorrells et al. | 370/338 |
| 2004/0209624 A1 * | 10/2004 | Rune et al. | 455/453 |
| 2004/0214582 A1 * | 10/2004 | Lan et al. | 455/452.2 |
| 2005/0190747 A1 * | 9/2005 | Sindhwani et al. | 370/352 |
| 2006/0088048 A1 * | 4/2006 | Bahl | 370/458 |
| 2006/0094440 A1 * | 5/2006 | Meier et al. | 455/453 |
| 2006/0221919 A1 * | 10/2006 | McRae et al. | 370/338 |
| 2006/0274713 A1 * | 12/2006 | Pandey et al. | 370/346 |
| 2008/0014956 A1 * | 1/2008 | Balasubramanian | 455/452.1 |
| 2008/0037499 A1 * | 2/2008 | Kumar et al. | 370/342 |
| 2011/0029644 A1 * | 2/2011 | Gelvin et al. | 709/220 |

* cited by examiner

*Primary Examiner* — Jutai Kao
(74) *Attorney, Agent, or Firm* — Aruba Networks; Varun A. Shah

(57) ABSTRACT

According to one embodiment of the invention, a method for assistance in roaming and call capacity comprises the transmission of a first message to obtain information regarding access point capacity prior to transmitting a data flow. The first message identifies the priority level of the data flow and a requested medium time for the data flow. Thereafter, an access point transmits a second message that identifies whether the requested medium time is available for the data flow. This may involve setting of a "zero" value in the medium time allowed if there are no resources available or a reduced medium time if limited resources are offered to the requesting wireless device.

43 Claims, 5 Drawing Sheets

MODTS ACTION MESSAGE — 800

| ORDER | INFORMATION |
|---|---|
| 1 | CATALOG |
| 2 | ACTION |
| 3 | DIALOG TOKEN |
| 4 | TSPEC — 810 |
| 5 | STATUS CODE — 820 |

*FIG. 8*

MODTS STATUS MESSAGE — 900

| ORDER | INFORMATION |
|---|---|
| 1 | CATALOG |
| 2 | ACTION |
| 3 | DIALOG TOKEN |
| 4 | TSPEC (OPTIMAL) |
| 5 | STATUS CODE — 910 |

*FIG. 9*

WIRELESS ROAMING WITH QOS AND DYNAMIC CALL CAPACITY MANAGEMENT

CROSS-REFERENCES TO RELATED APPLICATIONS

This application claims the benefit of priority on U.S. Provisional Patent Application No. 60/845,720 filed Sep. 18, 2006 and entitled "Wireless Roaming Assistance and Dynamic Call Capacity Management".

FIELD

Embodiments of the invention relate to the field of communications, and in accordance with one embodiment of the invention, to a network and method for assisting wireless devices in making informed roaming decisions, without sacrificing the Quality of Service (QoS) of existing connections and for allowing the wireless devices to be aware of admission control status without going through a high overhead message exchange process such as association and authentication.

GENERAL BACKGROUND

Over the last decade or so, many commercial and governmental entities have installed communication networks in order to allow their employees access various network resources. To improve efficiency and to support mobility, many wireless access enhancements have been added to local, personal, and wide area networks. Based on these enhancements, Wireless Local Area Networks (WLANs), Personal Area Networks (PANs) and Wide Area Networks (WLANs) have been and continue to be utilized by more and more users.

For instance, a WLAN supports communications between a number of wireless devices without any required line of sight for such communications. In current network configurations, multiple Access Points (APs) are connected using a distribution system, which may be a wireless or wired network, such as an Ethernet network for example, and each AP operates as a relay station by supporting communications between resources of the distribution system and wireless stations (STAs). STAs are fixed or mobile wireless devices, where the mobile devices enable users to alter their physical locations (e.g. roam), but still communicate over the network.

In wireless networks, "roaming" refers to the ability of a STA to move from one AP coverage area to another without any interruption in service or loss in connectivity. Apart from basic connectivity, it is important to maintain the same Quality of Service (QoS) for some applications such as voice and video, when a STA roams from one AP to another. Currently, when a STA wants to roam or associate with an AP, there are two primary methods that can be followed in order to assist the STA in making roaming decisions in compliance with the network's admission control constraints. "Admission control" is a network QoS procedure that is used to determine how bandwidth and latency are allocated to streams with various requirements. Admission control schemes are normally implemented at the APs to control the traffic entering the network.

For this first method, an AP periodically broadcasts load information, such as the number of stations associated with that AP or the total medium time available for example, as part of the beacons. However, this load information is unreliable because it does not provide an accurate representation of local constraints and other administrative policies. The granularity of aggregate medium time advertised in a load element is also insufficient for the STA to make appropriate roaming decisions based on QoS requirements, as it does not indicate the medium time per priority or access category. In addition, the AP may not update all the information contained in these periodic frames accurately before every transmission.

The second method involves associating to an AP, performing any necessary authentication and then negotiating QoS, such as using the ADDTS (ADD TSPEC) request. The AP may reject such a request after association and authentication, using a response message such as an Add Traffic Stream (ADDTS) response frame. When the request is rejected, the STA roams to another AP to restart the association and authentication process. While the first method is unreliable, the second method features high overhead because the STA needs to associate and possibly authenticate with the AP before making roaming decisions based on the inability to support requested QoS at the AP.

Moreover, after the acceptance of a STA's QoS request at the AP followed by the association of the STA, if the AP wants to re-adjust the QoS based on changes in local constraints or the RF environment or to allow an emergency call for a Voice Over Internet Protocol (VoIP) system, the AP has no graceful mechanism to modify an existing reservation. The AP has to actually disconnect the STA or delete the reservation or degrade the quality of the existing connections without an explicit notification to the STA in order to modify an existing reservation.

BRIEF DESCRIPTION OF THE DRAWINGS

The invention may best be understood by referring to the following description and accompanying drawings that are used to illustrate embodiments of the invention.

FIG. 8 is an exemplary embodiment of an MODTS ACTION message.

FIG. 9 is an exemplary embodiment of a MODTS STATUS message.

DETAILED DESCRIPTION

Embodiments of the invention relate to a network and method for assisting wireless devices in making informed roaming decisions without sacrificing Quality of Service (QoS), irrespective of whether the roaming is initiated by the wireless device or by the access point (AP).

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the invention. For example, software is generally considered to be executable code such as an application, an applet, a routine or even one or more executable instructions stored in a storage medium. The "storage medium" may include, but is not limited or restricted to a programmable electronic circuit, a semiconductor memory device inclusive of a volatile memory (e.g., random access memory, etc.) or a non-volatile memory (e.g., read-only memory, flash memory, etc.), a hard disk drive, a portable memory device (e.g., floppy diskette, a compact disk "CD", digital versatile disc "DVD", a digital tape, a Universal Serial Bus "USB" flash drive, etc.), or the like.

A "module" is hardware and/or software configured to perform one or more particular functions. A "message" is information arranged in a selected format that is transmitted over a communication link, namely a wired or wireless pathway. For instance, one type of message is a "PROBE REQUEST" that includes specific admission control information. Another type of message is a "PROBE RESPONSE" message which, according to this embodiment of the invention, responds to the PROBE REQUEST with medium time values to identify whether the AP has the resources to accommodate the request. The AP need not reserve any resources based on the PROBE REQUEST message. Other types of messages include, but are not limited or restricted to an ASSOCIATION REQUEST message, ASSOCIATION RESPONSE message, various authentication messages and the like.

Figure 1:
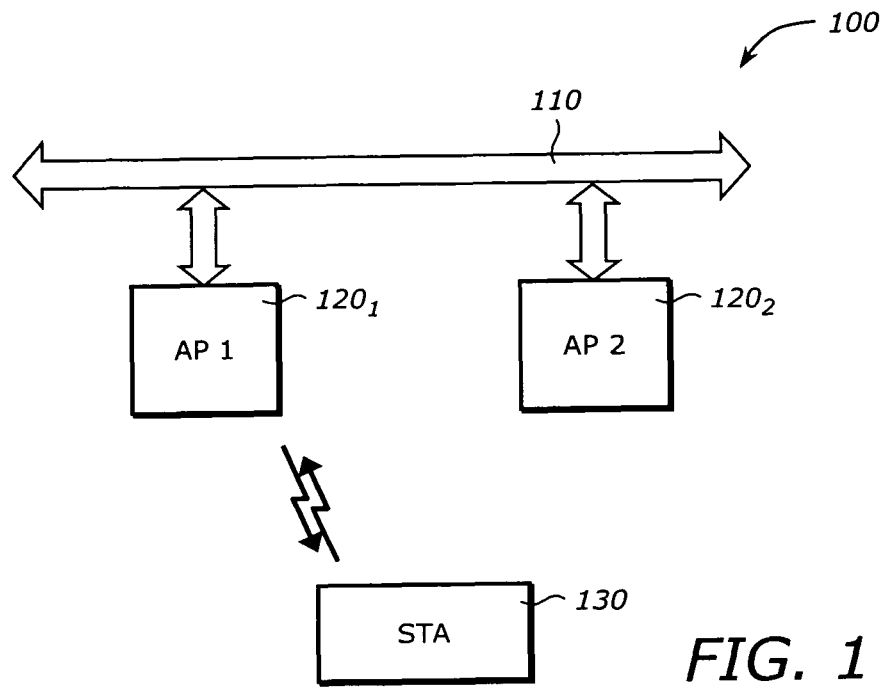
FIG. 1 is an exemplary embodiment of a wireless local area network in accordance with an embodiment of the invention.

Referring to FIG. 1, an exemplary embodiment of a wireless local area network (WLAN) 100 is shown. In accordance with one embodiment of the invention, WLAN 100 comprises a wired network 110 operating as an Open Source Interconnect (OSI) Layer 2/Layer 3 (L2/L3) network. The Distribution System (DS) consisting of a wired network 110 that supports communications between a plurality of access points (APs) such as APs $120_1$ and $120_2$. AP $120_1$ and $120_2$ support wireless communications, and thus, may be broadly construed as a wireless device.

According to one embodiment of the invention, AP $120_1$ provides wireless communications with one or more wireless devices 130 (hereinafter referred to as "STA"). More specifically, STA 130 constitutes any wireless communication device that processes information (e.g., portable computer, device with wireless networking card, personal digital assistant "PDA", Voice-over-IP "VoIP" telephone, etc.).

Figure 2:
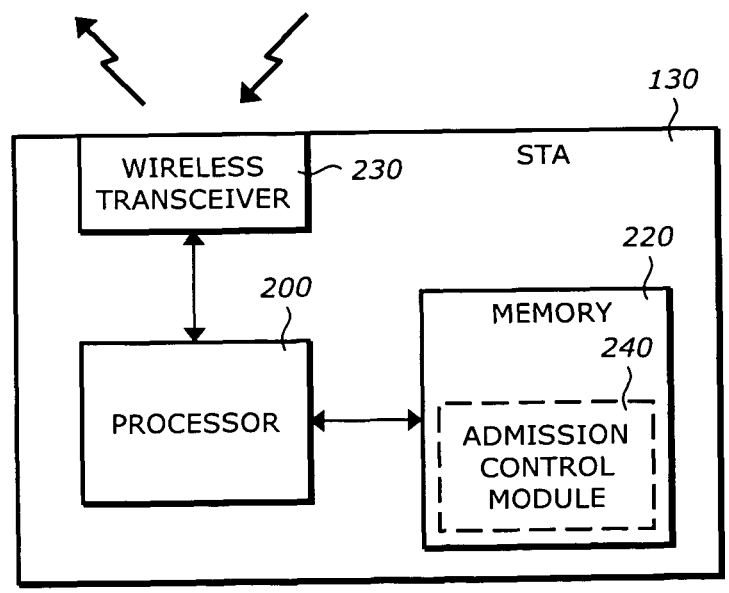
FIG. 2 is an exemplary embodiment of a wireless device (STA) in accordance with an embodiment of the invention.

Referring to FIG. 2, an exemplary embodiment of STA 130 is shown. According to one embodiment of the invention, STA 130 comprises a processor 200, memory 220 and a wireless transceiver 230. More specifically, wireless transceiver 230 operates as the interface for STA 130 and is controlled to receive or transmit messages as well as format assembly and/or disassembly of the messages as needed.

Figure 3:
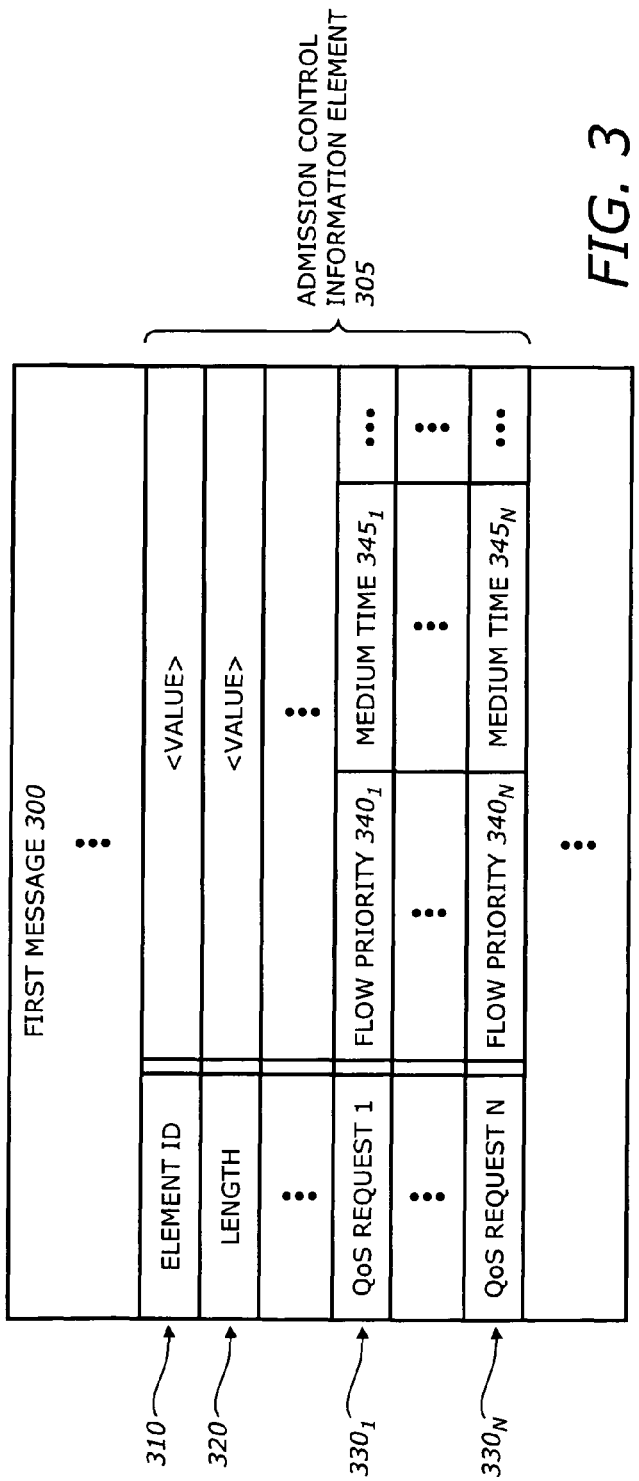
FIG. 3 is an exemplary embodiment of first message including the Admission Control information element in accordance with one embodiment of the invention.

Processor 200 is a component that is responsible for creating outgoing messages and for recovering information from the incoming messages. For instance, processor 200 may be adapted to execute an association/roaming module 240 in order to produce a first message 300 with flow/priority information as shown in FIG. 3 and to process messages with information within QoS Request fields as described below. Module 240 may be software stored in memory 220 or may be stored as firmware or hard wired into STA 130. Examples of various types of components forming processor 200 include, but are not limited or restricted to general purpose processor, application specific integrated circuit, programmable gate array, a digital signal processor, a micro-controller and the like.

Although not shown, one or more APs (e.g., AP $120_1$) comprise a processor, memory and a wireless transceiver as described above. However, in addition to association/roaming module 240, AP $120_1$ also includes an admission control module, normally software that is executed in order to respond to a message from a wireless device, such as STA 130 or even another AP for example, inquiring on support of a QoS request flow. Such operations of a wireless device and AP are described below.

It is contemplated that STA 130 may transmit first message 300 of FIG. 3 in order to ascertain whether one or more of the network APs (e.g., AP $120_1$ and AP $120_2$) has sufficient resources to accommodate a requested number of flows with certain QoS priority levels and other QoS parameters. For instance, first message 300 may be an unsolicited message that occurs before or during association with an AP such as PROBE REQUEST message, an ASSOCIATION REQUEST message or the like. In fact, where STA 130 is associated with AP $120_1$, the transmission may be directed to ascertaining roaming information from another AP (e.g., AP $120_2$) or may be directed to AP $120_1$ in order to gauge the capacity at that AP.

A second message 350 is returned by the AP with information regarding the AP's resources that may be made available to STA 130, if the STA initiates an association and an actual traffic flow request such as an ADDTS. In general, second message 350 may be any message that is transmitted in response to first message 300, which may occur before or during association with the AP. Examples of second message 350 include, but are not limited or restricted to a PROBE RESPONSE message and an ASSOCIATION RESPONSE message.

Referring now to FIG. 3, according to one embodiment of the invention, first message 300 may be a PROBE REQUEST message or any other message that includes an Admission Control Information Element 305. Admission Control Information Element 305 comprises a plurality of fields: an Element Identifier (ID) 310, an optional Length field 320 and one or more (N≥1) QoS Request fields $330_1$-$330_N$.

Herein, according to one embodiment of the invention, Element ID 310 identifies the particular type of information element 300 (e.g., specific vendor or information element identifier) while Length 320 specifies its size. Additional entries within Admission Control Information Element 305 include one or more (N) QoS Request(s) $330_1$-$330_N$. Each QoS Request (e.g., QoS Request $330_i$, where 1≤i≤N) includes a corresponding Flow Priority sub-field $340_i$ and Medium Time sub-field $345_i$, respectively. Of course, it is contemplated that QoS Request $330_i$ may be implemented with additional sub-fields other than those listed.

Figure 4:
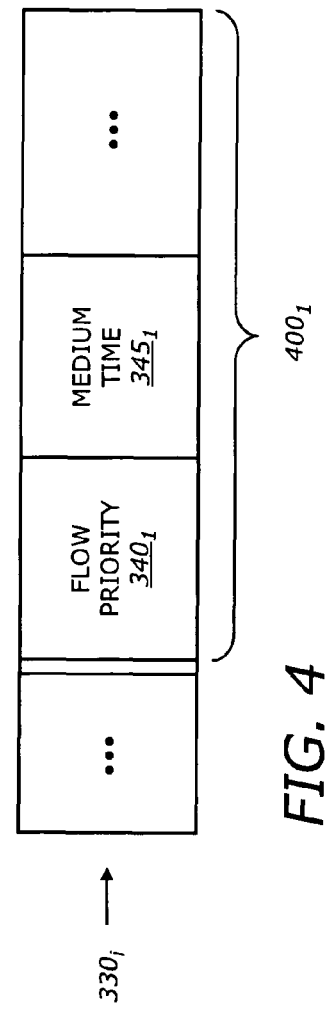
FIG. 4 is an exemplary embodiment of particular sub-fields of a QoS Request field for an Admission Control information element of FIG. 3.

As shown in FIG. 4, according to one embodiment of the invention, each QoS Request (e.g., QoS Request $330_i$) comprises information 400 that includes a corresponding Flow Priority sub-field $340_i$ and Medium Time $345_i$. Flow Priority sub-field $340_i$ includes a value that represents the priority of the requested flow, where higher priorities are assigned to information types that are most adversely affected by latency, throughput or jitter. Currently, these priority values may include, but are not limited or restricted to "0" background, "1" best efforts, "2" video and "3" voice corresponding to the Access Category Index (ACI) defined in the 802.11e/WMM specification. Values 4-255 are reserved, and thus, it is contemplated that the priority values may be different for other network embodiments.

Referring still to FIG. 4, Medium Time sub-field $345_i$ for QoS Request $330_i$ indicates a requested medium time according to predetermined units of time (e.g., 32 microseconds "µs"). The definition of the medium time is defined in IEEE 802.11e and WMM (Wi-Fi Multimedia) specifications.

Figure 5:
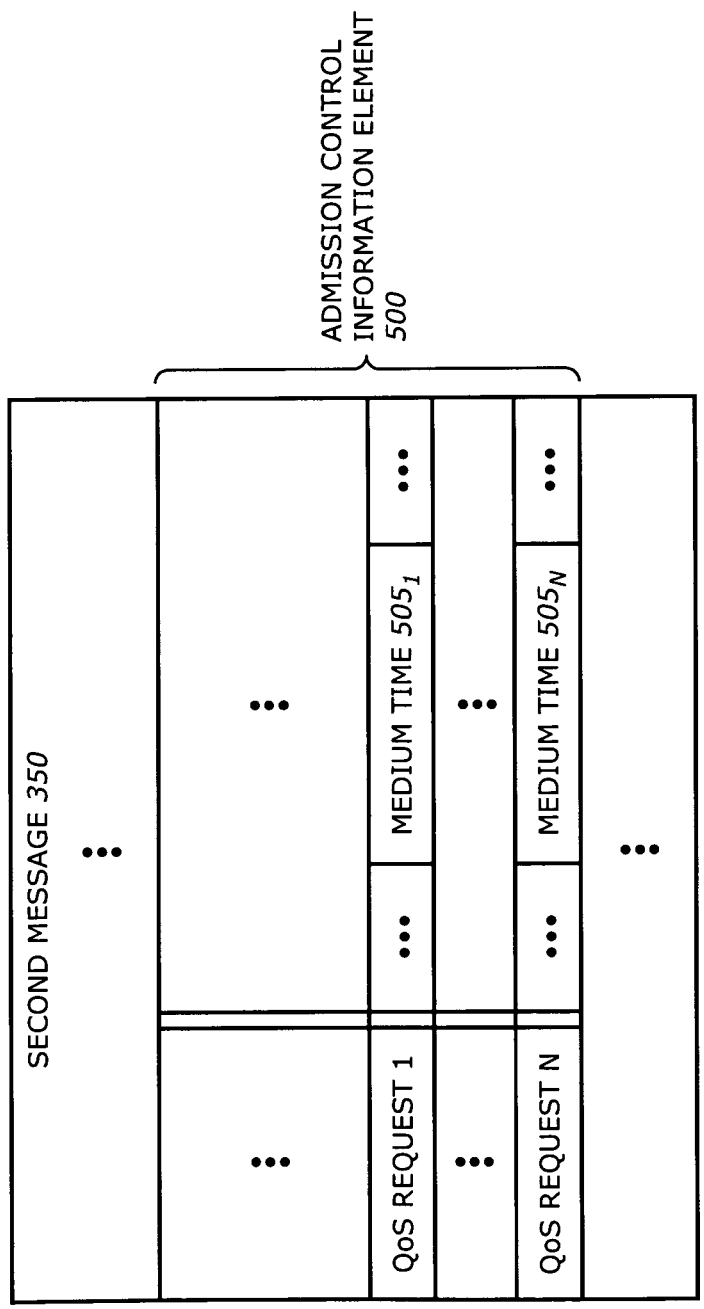
FIG. 5 is an exemplary embodiment of particular sub-fields of a QoS Request field for an Admission Control information element of a message in response to the first message of FIG. 3.

Similarly, referring now to FIG. 5, second message 350, such as a PROBE RESPONSE message for example, includes an Admission Control Information Element 500 that is returned by an AP in receipt of PROBE REQUEST message 300. According to this embodiment of the invention, PROBE REQUEST message 300 may be received by AP $120_2$, where STA 130 is not currently associated with AP $120_2$ as shown in FIG. 1. As a result, at a minimum, AP $120_2$ returns PROBE RESPONSE message 350 that includes Admission Control Information Element 500 having at least Medium Time sub-fields $505_1$-$505_N$, which identify the amount of medium time (in the predetermined units of time) that are allowed (or available) to STA 130 for "N" requested flows. Of course, the same exchange may occur for ASSOCIATION REQUEST and ASSOCIATION RESPONSE messages implemented with an Admission Control Information Elements 300 and 500, respectively.

Figure 6:
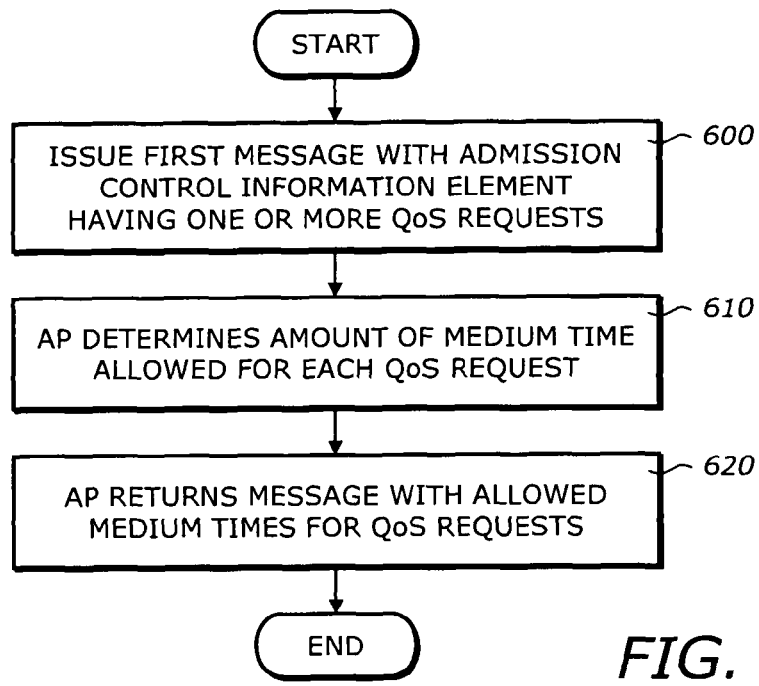
FIG. 6 is an exemplary flowchart of an embodiment of the operations performed by wireless device and/or AP for roaming and capacity determinations.

Referring now to FIG. 6, an exemplary flowchart of an embodiment of the operations performed by wireless device and/or AP for roaming and capacity determinations is shown. First, the wireless device (STA) issues a first message that comprises a specific Admission Control information element including one or more QoS Requests each associated with a particular data flow (block 600). Each QoS Request identifies the priority and a desired medium time for the data flow. Examples of the first message include, but are not limited or restricted to a PROBE REQUEST message in accordance with any IEEE 802.11 standard.

Upon receiving the message and determining that it has sufficient resources to accommodate the QoS Request, the AP transmits a message including the Admission Control information element to the STA (block 610). An example of the second message includes, but is not limited or restricted to a PROBE RESPONSE message. The AP need not reserve any resources based on the first message. Instead, the AP sets within the Admission Control information element to a value that identifies the amount of medium time (in the predetermined units of time) that is allowed (or available) to the STA (block 620). In general, the value could range between "zero" (where no AP resources are available) to the medium time requested (where sufficient AP resources are available). For instance, in certain situations, the AP may return a medium time that is different from and lower than the requested medium time. The STA may accept the lower medium time or seek communication support from another AP. The AP may also indicate the reason for the modified QoS or the reason for the denial, in the response message.

It is contemplated that this admission control assistance procedure may be used for VoIP phones (STAs), mobile video or other wireless voice and video devices. For VoIP phones, where Call Admission Control (CAC) is enabled, the configured limits (e.g., maximum calls) may be taken into account while responding to the first message. If CAC is not enabled, the AP may use local constraints, the current traffic condition and maximum capacity to derive the medium time value.

Currently, as described in the IEEE 802.11e standard, Traffic Specification (TSPEC) is the primary mechanism for communicating QoS parameters. In accordance with TSPEC, a STA sends TSPEC requests to an AP in the form of an Add Traffic Stream (ADDTS) management action frames (e.g., ADDTS Request message). Thereafter, the AP evaluates if there are available resources to meet the requested TSPEC, and if not, the AP may respond to the ADDTS Request message with an ADDTS Response message, which may offer the STA with an alternate TSPEC (perhaps with lower performance QoS parameters) or may deny the TSPEC request entirely.

However, after the STA has already associated and successfully negotiated TSPEC using the ADDTS Request/Response exchange, the AP may want to modify the QoS characteristics within allocated flows of this STA. Currently, this is accomplished only through a Delete Traffic Stream (DELTS) message, which disconnects or degrades the communications between the STA and AP. Instead, an establishment of a new QoS Action frame is proposed.

Figure 7:
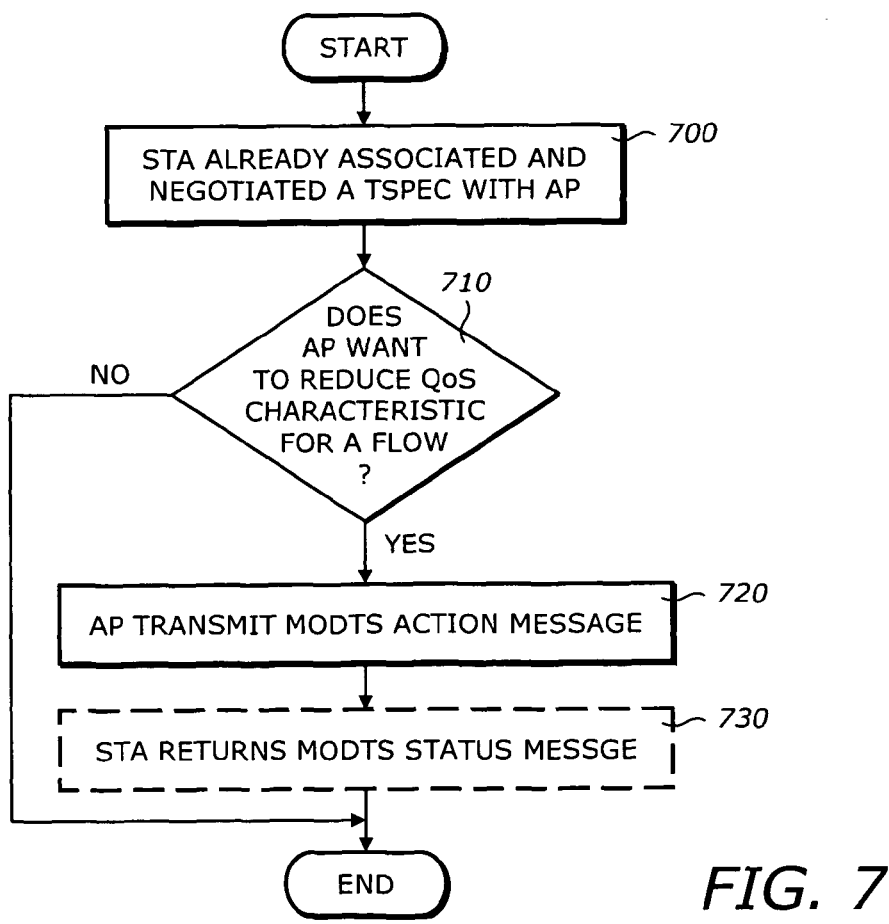
FIG. 7 is an exemplary embodiment of the operations for degrading QoS characteristics for allocated flows of an STA based on a new QoS Action frame exchange.

As shown in FIG. 7, an exemplary embodiment of the operations for degrading QoS characteristics for allocated flows of an STA based on a new QoS Action frame exchange is shown. Herein, when an STA is already associated and successfully negotiated a TSPEC, in the event that the AP wishes to reduce the QoS characteristics for an allocated flow, it transmits a Modify Traffic Stream (MODTS) ACTION message (blocks 700, 710 and 720).

As also shown in FIG. 8, MODTS ACTION message 800 comprises a TSPEC field 810, which follows the same format as defined in the IEEE 802.11e standard but is adapted to indicate degraded QoS parameters. The AP may send MODTS ACTION message 800 for one or more flows from the same STA. A Status code 820 indicates the reason for MODTS ACTION message 800.

Referring back to FIG. 7, upon receipt of MODTS ACTION message 800 of FIG. 8, the STA optionally responds with a MODTS STATUS message 900 (block 730). An embodiment of MODTS STATUS message 900 is illustrated in FIG. 9. MODTS STATUS message 900 includes information on whether the STA accepts the modified TSPEC or it is going to look for a new AP. Such information may be identified by a selected value set within a Status Code field 910 of MODTS STATUS message 900. As a result, the AP is able to degrade QoS characteristics for a given flow without disconnection of the STA-AP communications.

While the invention has been described in terms of several embodiments, the invention should not limited to only those embodiments described, but can be practiced with modification and alteration within the spirit and scope of the appended claims. For instance, according to another embodiment of the invention, the QoS Request field of the first message includes a sub-field that identifies a requested resource other than medium time including, but not limited or restricted to bits per second, jitter, latency, frame size and frames per second. The second message would include a subfield that identifies the allowed or allocated resources that can be provided from a second wireless device (e.g., AP) to a second wireless device (e.g., STA). The description is thus to be regarded as illustrative instead of limiting.

What is claimed is:

1. A method for assisting a wireless device in making informed roaming decisions, comprising:
    transmitting a first message by the wireless device to an access point, the first message being a PROBE REQUEST message transmitted (i) prior to an Association phase that, once completed, allows the wireless device to start a wireless connection set up for transmitting data frames being at least part of the data flow and (ii) before an association with the access point, the first message identifying a requested medium time for a data flow associated with a priority level prior to transmitting the data flow; and receiving, by the wireless device, a second message identifying whether the requested medium time is available for the data flow, the second message being received prior to reservation of resources within the access point to accommodate the data flow.

2. The method of claim 1, wherein PROBE REQUEST message comprises an information element including (i) an Element Identifier, (ii) a Length field and (iii) at least one Quality of Service (QoS) field associated with the data flow.

3. The method of claim 2, wherein the second message is a PROBE RESPONSE message that comprises an information element including a QoS field that includes information identifying a medium time available for the data flow at the requested priority level.

4. The method of claim 3, wherein the medium time identified by the PROBE RESPONSE message is set to zero if the access point transmitting the PROBE RESPONSE message has insufficient resources for providing the requested medium time.

5. The method of claim 3, wherein the medium time identified by the PROBE RESPONSE message is set to a non-zero value that translates into a time less than the requested medium time when the access point transmitting the PROBE RESPONSE message has insufficient resources for providing the requested medium time.

6. The method of claim 1 further comprising:
receiving a third message from the access point to reduce Quality of Service (QoS) characteristics for data flows from the wireless device that is already associated with the access point.

7. The method of claim 1, wherein the available medium time in the second message is less than the requested medium time in the first message.

8. The method of claim 1, wherein the wireless device is a Voice-over-IP telephone transmits the first message, and where Call Admission Control is enabled, configuration limits are taken into account in responding to the first message.

9. The method of claim 1, wherein the medium time and the priority level are identified in an element associated with admission control.

10. The method of claim 9, wherein the element associated with admission control comprises an identifier that identifies a type and a quality of service (QoS) request, the QoS request includes (i) a value that represents a priority of the data flow and (ii) the requested medium time according to a predetermined unit of time.

11. The method of claim 1 further comprising:
transmitting a third message requesting the access point to reserve resources for the data flow.

12. A method for assisting a wireless device in making informed roaming decisions, comprising:
receiving a first message by an access point from the wireless device, the first message being a PROBE REQUEST message transmitted (i) before to an association with the wireless device and (ii) prior to an Association phase that, once completed, starts a wireless connection set up for transmission of data frames being at least part of the data flow, the first message comprises a requested medium time for a data flow associated with a priority level prior to transmitting the data flow;
determining by the access point whether it can support the data flow for the requested medium time; and
prior to reserving resources within the access point to accommodate the data flow, transmitting a second message that comprises an available medium time for the data flow associated with the priority level, the available medium time in the second message is less than or equal to the requested medium time in the first message.

13. The method of claim 12, wherein the PROBE REQUEST message that comprises an information element including (i) an Element Identifier, (ii) a Length field and (iii) at least one Quality of Service (QoS) field associated with the data flow.

14. The method of claim 13, wherein the second message is a PROBE RESPONSE message that comprises an information element including a QoS field having information identifying a medium time offered by the access point.

15. The method of claim 14, wherein the medium time identified by the PROBE RESPONSE message is set to zero if the access point is unable to provide the requested medium time.

16. The method of claim 14, wherein the information element of the second message further comprises a sub-field to contain a status code to identify a reason for an acceptance or denial of the requested medium time.

17. The method of claim 14, wherein the medium time identified by the PROBE RESPONSE message is set to a non-zero value that translates into a time less than the requested medium time when the access point transmitting the PROBE RESPONSE message is able to provide a portion of the requested medium time.

18. The method of claim 13, wherein the first message is a message formatted as a frame according to an Institute of Electrical and Electronic Engineers (IEEE) wireless standard.

19. The method of claim 12, wherein the receiving of the first message is conducted prior to the Association phase that is prior to a start of a wireless connection set-up.

20. The method of claim 12 further comprising:
receiving a third message requesting the access point to reserve the resources for the data flow.

21. An access point comprising:
means for receiving a first message identifying a requested medium time to maintain a selected priority level for a data flow over a wireless medium targeting a wireless device, the first message being a PROBE REQUEST message transmitted (i) prior to an Association phase that, once completed, starts a wireless connection set up for transmission of data frames being at least part of the data flow and (ii) before an association with the wireless device;
means for determining whether the requested medium time is available for the data flow; and
means for transmitting a second message in response to the first message prior to reserving resources for the data flow, the second message identifying an available medium time associated with the priority level for the data flow, wherein the available medium time in the second message is less than or equal to the requested medium time in the first message; and
means for transmitting a third message to reduce Quality of Service (QoS) characteristics for the data flow without disconnecting communications with the wireless device where the requested medium time was previously available.

22. The access point of claim 21 to transmit the second message that comprises an information element including a QoS field that is set to a value representing a medium time available for the data flow that is less than the requested medium time.

23. The access point of claim 21 to transmit the second message that comprises an information element including a QoS field that is set to a value representing a medium time available for the data flow that is different from the requested medium time.

24. The access point of claim 21 being implemented with a system including the wireless device with data for transmission as the data flow.

25. The access point of claim 24, wherein the system includes the wireless device that is adapted to transmit the first message comprising an information element including (i) an Element Identifier, (ii) a Length field to identify the length of the information element and (iii) at least one Quality of Service (QoS) field associated with the data flow, the QoS field including a first sub-field identifying a priority level of the data flow and a second sub-field identifying the requested medium time of the data flow.

26. The access point of claim 21, wherein first message is received prior to the association with the wireless device being a period in wireless communications where a wireless connection has yet to be established and no data frames for the data flow are received from the wireless device.

27. A method for assisting a first wireless device in making informed roaming decisions, comprising:
transmitting a first message by the first wireless device to a second wireless device, the first message being a PROBE REQUEST message transmitted (i) prior to an Association phase that, once completed, allows the first wireless device to start a wireless connection set up for transmitting data frames being at least part of the data flow and (ii) before an association with the second wireless device, the first message identifying a requested medium time for a data flow associated with a priority level prior to transmitting the data flow; and
receiving, by the first wireless device, a second message identifying whether the requested medium time is available for the data flow, the second message being received prior to the second wireless device reserving resources to accommodate the data flow.

28. The method of claim 27, wherein the second wireless device is an access point.

29. A non-transitory storage medium comprising instructions which, when executed by one or more hardware processors of a first wireless device, causes performance of operations comprising:
transmitting a first message by the first wireless device to a second wireless device, the first message being a PROBE REQUEST message transmitted (i) prior to an Association phase that, once completed, allows the wireless device to start a wireless connection set up for transmitting data frames being at least part of the data flow and (ii) before an association with the first wireless device, the first message identifying a requested medium time for a data flow associated with a priority level prior to transmitting the data flow; and
receiving, by the first wireless device, a second message identifying whether the requested medium time is available for the data flow, the second message being received prior to reservation of resources within the second wireless device to accommodate the data flow.

30. The non-transitory storage medium of claim 29, wherein the PROBE REQUEST message comprises an information element including (i) an Element Identifier, (ii) a Length field and (iii) at least one Quality of Service (QoS) field associated with the data flow.

31. The non-transitory storage medium of claim 30, wherein the second message is a PROBE RESPONSE message that comprises an information element including a QoS field that includes information identifying a medium time available for the data flow at the requested priority level.

32. The non-transitory storage medium of claim 31, wherein the medium time identified by the PROBE RESPONSE message is set to zero if the second wireless device transmitting the PROBE RESPONSE message has insufficient resources for providing the requested medium time.

33. The non-transitory storage medium of claim 31, wherein the medium time identified by the PROBE RESPONSE message is set to a non-zero value that translates into a time less than the requested medium time when the access point transmitting the PROBE RESPONSE message has insufficient resources for providing the requested medium time.

34. The non-transitory storage medium of claim 29 further comprising instructions which, when executed by the one or more hardware processors of the first wireless device, causes performance of operations comprising:
receiving a third message from the second wireless device to reduce Quality of Service (QoS) characteristics for data flows from the first wireless device that is already associated with the second wireless device.

35. The non-transitory storage medium of claim 29, wherein the second wireless device is an access point.

36. The non-transitory storage medium of claim 29, wherein the first wireless device is a Voice-over-IP telephone transmits the first message, and where Call Admission Control is enabled, configuration limits are taken into account in responding to the first message.

37. A non-transitory storage medium comprising instructions which, when executed by one or more hardware processors of a second wireless device, causes performance of operations for assisting a first wireless device in making informed roaming decisions, comprising:
receiving a first message from the first wireless device, the first message being a PROBE REQUEST message transmitted (i) before to an association with the first wireless device and (ii) prior to an Association phase that, once completed, starts a wireless connection set up for transmission of data frames being at least part of the data flow, the first message comprises a requested medium time for a data flow associated with a priority level prior to transmitting the data flow;
determining by the second wireless device whether it can support the data flow for the requested medium time; and
prior to reserving resources within the second wireless device to accommodate the data flow, transmitting a second message that comprises an available medium time for the data flow associated with the priority level, the available medium time in the second message is less than or equal to the requested medium time in the first message.

38. The non-transitory storage medium of claim 37, wherein the PROBE REQUEST message that comprises an information element including (i) an Element Identifier, (ii) a Length field and (iii) at least one Quality of Service (QoS) field associated with the data flow and the second message is a PROBE RESPONSE message that comprises an information element including a QoS field having information identifying a medium time offered by the access point.

39. The non-transitory storage medium of claim 38, wherein the medium time identified by the PROBE RESPONSE message is set to zero if the second wireless device is unable to provide the requested medium time.

40. The non-transitory storage medium of claim 38, wherein the information element of the second message further comprises a sub-field to contain a status code to identify a reason for an acceptance or denial of the requested medium time.

41. The non-transitory storage medium of claim 38, wherein the medium time identified by the PROBE RESPONSE message is set to a non-zero value that translates into a time less than the requested medium time when the access point transmitting the PROBE RESPONSE message is able to provide a portion of the requested medium time.

42. The non-transitory storage medium of claim 37, wherein the second wireless device is an access point.

43. The non-transitory storage medium of claim 37, wherein the first message is a message formatted as a frame according to an Institute of Electrical and Electronic Engineers (IEEE) wireless standard.

\* \* \* \* \*